US008897233B2

(12) United States Patent
Yang et al.

(10) Patent No.: US 8,897,233 B2
(45) Date of Patent: Nov. 25, 2014

(54) COMMUNICATION METHOD AND APPARATUS FOR CONTROLLING DATA TRANSMISSION AND RETRANSMISSION OF MOBILE STATION AT BASE STATION

(75) Inventors: Tao Yang, Shanghai (CN); Mingli You, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 462 days.

(21) Appl. No.: 12/672,616

(22) PCT Filed: Aug. 10, 2007

(86) PCT No.: PCT/CN2007/002403
§ 371 (c)(1),
(2), (4) Date: Feb. 8, 2010

(87) PCT Pub. No.: WO2009/021349
PCT Pub. Date: Feb. 19, 2009

(65) Prior Publication Data
US 2011/0216712 A1 Sep. 8, 2011

(51) Int. Cl.
*H04W 4/00* (2009.01)
*H04L 1/00* (2006.01)
*H04L 1/16* (2006.01)

(52) U.S. Cl.
CPC ............ *H04L 1/0079* (2013.01); *H04L 1/0025* (2013.01); *H04L 1/1607* (2013.01)
USPC ........................................................ 370/329

(58) Field of Classification Search
USPC ......... 370/310, 322, 328, 329, 330, 341, 348, 370/395.41, 395.42, 395.43; 709/225; 455/422.1, 450, 451, 452.1, 452.2, 455/464, 509; 714/748–749
See application file for complete search history.

(56) References Cited

U.S. PATENT DOCUMENTS 5,751,708 A * 5/1998 Eng et al. ................. 370/395.42
7,155,236 B2 * 12/2006 Chen et al. .................... 370/329

(Continued)

FOREIGN PATENT DOCUMENTS

CN 1914844 A 2/2007
CN 1946015 A 4/2007

(Continued)

OTHER PUBLICATIONS

International Search Report, Dec. 20, 2007.

(Continued)

*Primary Examiner* — Jeffrey M Rutkowski
(74) *Attorney, Agent, or Firm* — Fay Sharpe, LLP

(57) ABSTRACT

Disclosed is a communication method for controlling data transmission of a mobile station at a base station. The method comprises the steps of: determining, by the base station, a transmission operation to be performed by the mobile station in next transmission time interval based on HARQ and schedule result; sending, in a downlink by the base station, an ACK/NACK packet, an indicator indicating the type of the transmission by the mobile station and a resource use command for the used resource based on the determined transmission operation; receiving, by the mobile station, the ACK/NACK packet, the indicator and the resource use command sent from the base station, and performing respective transmission operations according to the received ACK/NACK packet, indicator and resource use command without using any data-associated signaling in an uplink.

21 Claims, 4 Drawing Sheets

(56) References Cited

U.S. PATENT DOCUMENTS

| | | | |
|---|---|---|---|
| 7,631,239 B2 | 12/2009 | Yeo et al. | |
| 7,752,519 B2 | 7/2010 | Yeo et al. | |
| 7,813,324 B1* | 10/2010 | Goel et al. | 714/748 |
| 2005/0243762 A1* | 11/2005 | Terry et al. | 370/328 |
| 2005/0281212 A1* | 12/2005 | Jeong et al. | 370/310 |
| 2007/0011555 A1* | 1/2007 | Kim et al. | 714/749 |
| 2007/0183451 A1 | 8/2007 | Lohr et al. | |
| 2008/0081651 A1 | 4/2008 | Kuroda et al. | |
| 2008/0304447 A1* | 12/2008 | Kim et al. | 370/329 |

FOREIGN PATENT DOCUMENTS

| | | | |
|---|---|---|---|
| CN | 1960235 A | | 5/2007 |
| EP | 1 734 714 A1 | | 12/2006 |
| EP | 1784036 A1 | | 5/2007 |
| JP | 2004-104293 | | 4/2004 |
| JP | 2007-166642 | | 6/2007 |
| WO | WO 2004/102980 A2 | | 11/2004 |
| WO | WO 2006/016457 A1 | | 2/2006 |
| WO | WO 2007/073040 A1 | | 6/2007 |

OTHER PUBLICATIONS

Extended European Search Report for Appl. No. EP 07 78 5308 dated Jul. 24, 2013.

* cited by examiner

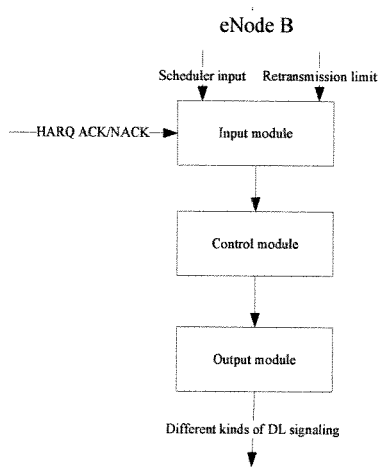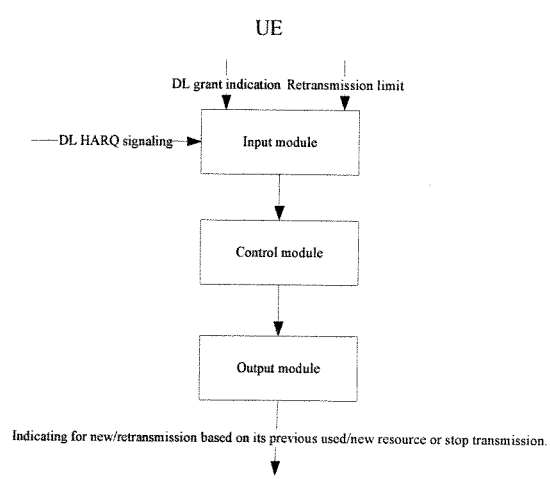
Fig. 4
Fig. 5

COMMUNICATION METHOD AND APPARATUS FOR CONTROLLING DATA TRANSMISSION AND RETRANSMISSION OF MOBILE STATION AT BASE STATION

FIELD OF THE INVENTION

The present invention relates to a method and apparatus for controlling at a base station the data transmission and retransmission of a mobile station, and in particular to a method and apparatus for, in a wireless communication network, controlling new data transmission and retransmission of a mobile station by a base station with minimal signaling overhead in a downlink and performing communication without any data-associated signaling in an uplink.

BACKGROUND OF THE INVENTION

The 3GPP ($3^{rd}$ Generation Partnership Project) launched LTE (Long Term Evolution) in 2005, which aims to provide support for increasing requirements from operators and subscribers with higher data throughput and better network performance.

The 3GPP R6 has introduced High Speed Downlink Packet Access (HSDPA) and High Speed Uplink Packet Access (HSUPA). The primary design target for a wireless communication system is packet field service to support highly real-time service and reduce delay in wireless network. The current criterion is derived with reference mainly to Quality of Services (QoS) of various real-time services, such as Voice over IP (VoIP) and the like. Meanwhile, status transition delay of a control plane in the system is reduced, which is helpful to improve users' experience of network services. The air unidirectional delay is less than 5 ms in the user data plane, and the delay for a user transiting from an idle status to a connection status is less than 100 ms in the control plane. The 3GPP evolution involves technical standards of CDMA2000, WCDMA (Wideband Code Division Multiple Accesses) and LTE.

FIG. 1 shows schematically a mobile communication network by example of a LTE system. As shown in FIG. 1, in the mobile communication network, a plurality of base stations (NodeBs) are connected with a core network gateway (MME/UPE). One core network gateway manages several NodeB nodes. Each of the plurality of base stations can adapt more than one mobile station (i.e., User Equipment, UE), and each mobile station can always perform transmission/reception to/from the respective base station by using a dedicated channel (Dedicated Physical Control Channel, DPCCH). Further, the mobile stations in the mobile communication network can perform data reception with HSDPA and data transmission with EUDCH (Enhanced Uplink Dedicated Channel). The base stations conduct schedule based on these packet transmission systems, and allocate radio resources to the respective mobile stations for communication with the mobile stations.

In order to achieve an error-free data transmission, the error control strategy adopted in LTE is still Hybrid ARQ (HARQ) obtained from a combination of FEC (Forward Error Coding) and ARQ. HARQ utilizes a retransmission strategy of Increment Redundancy (IR). Retransmission serves as an approach to error correction in the data link layer of mobile communication, and HARQ has a good performance in this respect.

To improve system performance, HSUPA adopts the technique HARQ at the physical layer and supports two types of combining mechanisms, i.e., Chase Combining (CC) of the same packets retransmitted from a base station and IR Combining of packets containing different information (i.e., redundant information) retransmitted from a base station. Information is transmitted directly between UE and NodeB in a fashion of ACK/NACK, in which the receiving side will send ACK information to the transmitting side over a respective channel if it receives data correctly, otherwise, it will send NACK information. This facilitates the transmitting side to learn whether a retransmission is needed in an accurate and timely way.

In current phase, LTE uplink transmission has the following characters:

1. The 3GPP RAN 1 work group has determined not to use any data-associated signaling in uplink transmission;
2. Synchronized HARQ is adopted in LTE uplink transmission;
3. It has been proposed now that a common Maximum HARQ retransmission number is applied for all radio bearers;
4. The 3GPP has now specified that adaptive HARQ can be used for uplink transmission; and
5. The downlink signaling overhead should be minimized to increase the system capacity.

In HSUPA, the data-associated signaling, RAN=0, is used in the uplink to indicate to eNodeB (base station) that the mobile station is now performing new data transmission, which aims to ensure a correct HARQ combination by the eNodeB, so that the base station can determine, based on the quality of received signals, whether the mobile station will conduct new data transmission or data retransmission in the next step. In LTE, however, the RAN 1 work group has determined not to use any data-associated signaling in uplink transmission. As a result, the mobile station (UE) cannot notify the eNodeB whether it is conducting a new data transmission or data retransmission. It is thus impossible to ensure a correct HARQ combination by the eNodeB.

In HSUPA, the data-associated signaling is used in the uplink to indicate a new data transmission, for example, notifying the receiving side how the data are transmitted via signaling. The receiving side can demodulate the data using a corresponding method. Unfortunately, the prior art strategy cannot be applied in LTE since the use of any data-associated signaling is not allowed in LTE uplink. Occasions may occur that the receiving side (base station) is not aware that the transmitting side (UE) has begun to transmit new data and still waits for retransmission of previous data from the transmitting side. To keep synchronization between the transmitting and receiving sides in a certain fashion, the receiving side shall learn whether the transmitting side is transmitting new data or retransmitting data.

SUMMARY OF THE INVENTION

In view of the above problem, an object of the present invention is to provide a communication method and apparatus for controlling, at a base station, new data packet transmission and data packet retransmission of a mobile station, which enables the base station to control new data transmission or data retransmission of the mobile station with minimal signaling overhead in downlink, while not using any data-associated signaling in uplink.

According to an aspect of the present invention, it provides a communication method for controlling data transmission of a mobile station at a base station, the method comprises the steps of:

determining, by the base station, a transmission operation to be performed by the mobile station in next transmission time interval based on HARQ and schedule result;

sending, in a downlink by the base station, an ACK/NACK packet, an indicator indicating the type of the transmission by the mobile station and a resource use command for the used resource based on the determined transmission operation;

receiving, by the mobile station, the ACK/NACK packet, the indicator and the resource use command sent from the base station, and performing respective transmission operations according to the received ACK/NACK packet, indicator and resource use command without using any data-associated signaling in an uplink.

According to another aspect of the present invention, it provides a base station used in a wireless communication system, the base station comprises:

an input unit adapted to receive a scheduler input signal, retransmission limit number and an HARQ ACK/NACK packet;

a control unit adapted to determine a transmission operation to be performed by the mobile station in next transmission time interval based on information provided from the input unit, and to form downlink instructions including an ACK/NACK packet, and/or an indicator indicating the type of the transmission by the mobile station, and/or a resource use command for the used resource based on the determined transmission operation; and an output unit adapted to send in a downlink a variety of instructions formed by the control unit.

According to further aspect of the present invention, it provides a mobile station used in a wireless communication system, the mobile station comprises:

an input unit adapted to receive a resource use command, retransmission limit number and a downlink HARQ signaling from a base station, and to provide them to a control unit;

a control unit adapted to control the mobile station to perform a transmission operation corresponding to a downlink instruction received from the base station based on information provided from the input unit; and an output unit adapted to, according to a control signal from the control unit, transmit new data packet or retransmit data packet by using previously used resource or newly allocated resource.

According to the present invention, the ACK/NACK packet, the indicator indicating the type of the transmission by the mobile station in the downlink, and the resource use command for the used resource are used to control the mobile station to transmit new data packet or retransmit data packet with previously used resource or newly allocated resource, thereby keeping the base station and the mobile station synchronized in the cases of new data transmission and retransmission.

According to the present invention, the base station instructs the mobile station to perform transmission of new data or retransmission, by sending to the mobile station the ACK/NACK packet, the transmission type indicator and the resource use command, and instructs the mobile station to use old resource or newly allocated resource in transmission by sending the resource use command. In this way, the signaling overhead in the downlink can be minimized, and no data-associated signaling will be used in the uplink for control over the transmission operation of the mobile station.

BRIEF DESCRIPTION OF THE DRAWINGS

The above and other objects, features and advantages of the present invention will be more apparent from the following description of preferred embodiments with reference to the drawings, in which:

FIG. 4 is a block diagram showing a simplified configuration in a base station according to an embodiments of the present invention;

FIG. 5 is a block diagram showing a simplified configuration in a mobile station according to an embodiments of the present invention.

DETAILED DESCRIPTION OF THE PREFERRED EMBODIMENTS

A detailed description of preferred embodiments of the present invention will be given below in conjunction with the drawings. In the description, any detail and function unnecessary to the present invention are omitted so that the above objects, features and advantages of the present invention will not be obscured.

In a communication method under the 3GPP standards, HSDPA and HSDPA are used for packet communication between a base station and mobile stations. In such a packet communication method, when a mobile station in the network transmits communication data to the base station, the base station measures the quality of a signal received from the mobile station, and controls, via a downlink, the mobile station to transmit new data or retransmit data.

According to an embodiments of the present invention, a wireless communication network structure under the 3GPP LTE architecture is taken as an example to describe a process in which an eNodeB (evolved base station) uses an indicator and a resource allocation command in the downlink to control communication of a mobile station (UE: user equipment). It will be appreciated that the present invention is not limited to the 3GPP LTE architecture, but can be applied in any other scenario where no data-associated signaling is used in an uplink.

In the present invention, the base station determines a transmission operation to be performed by the mobile station in next transmission time interval based on HARQ and schedule information. Further, the base station sends, in a downlink, an ACK/NACK packet, an indicator indicating the type of the transmission by the mobile station and a resource use command for the used resource based on the determined transmission operation. The mobile station receives the ACK/NACK packet, the indicator and the resource use command sent from the base station, and performs respective transmission operations according to the received ACK/NACK packet, indicator and resource use command without using any data-associated signaling in an uplink. In the present invention, the transmission type identifies whether the mobile station will transmit new data packet or retransmit data packet just previously transmitted. The resource use command instructs the mobile station to use newly allocated resource for transmission. The transmission type indicator can be represented by information in the resource use command. For example, one bit can be set in the resource use command as the transmission type indicator. For example, it can indicate transmission of new data packet if the bit represents '1', while it can indicate retransmission of data packet if the bit represents '0'.

Figure 1:
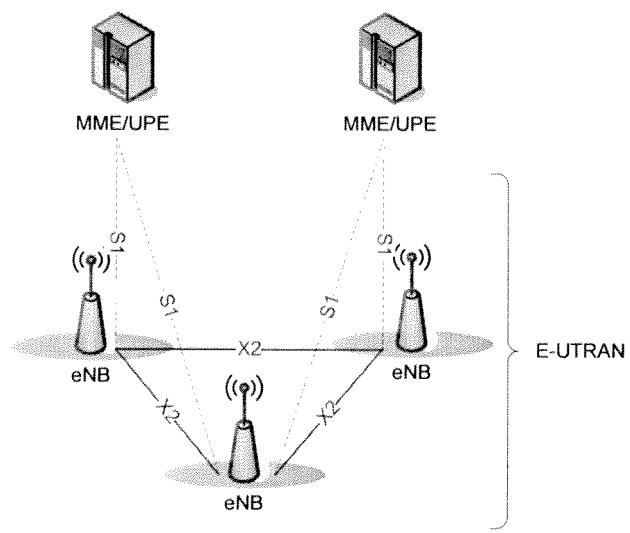
FIG. 1 is a schematic diagram showing the system architecture of a LTE wireless access network in the prior art.
Figure 2:
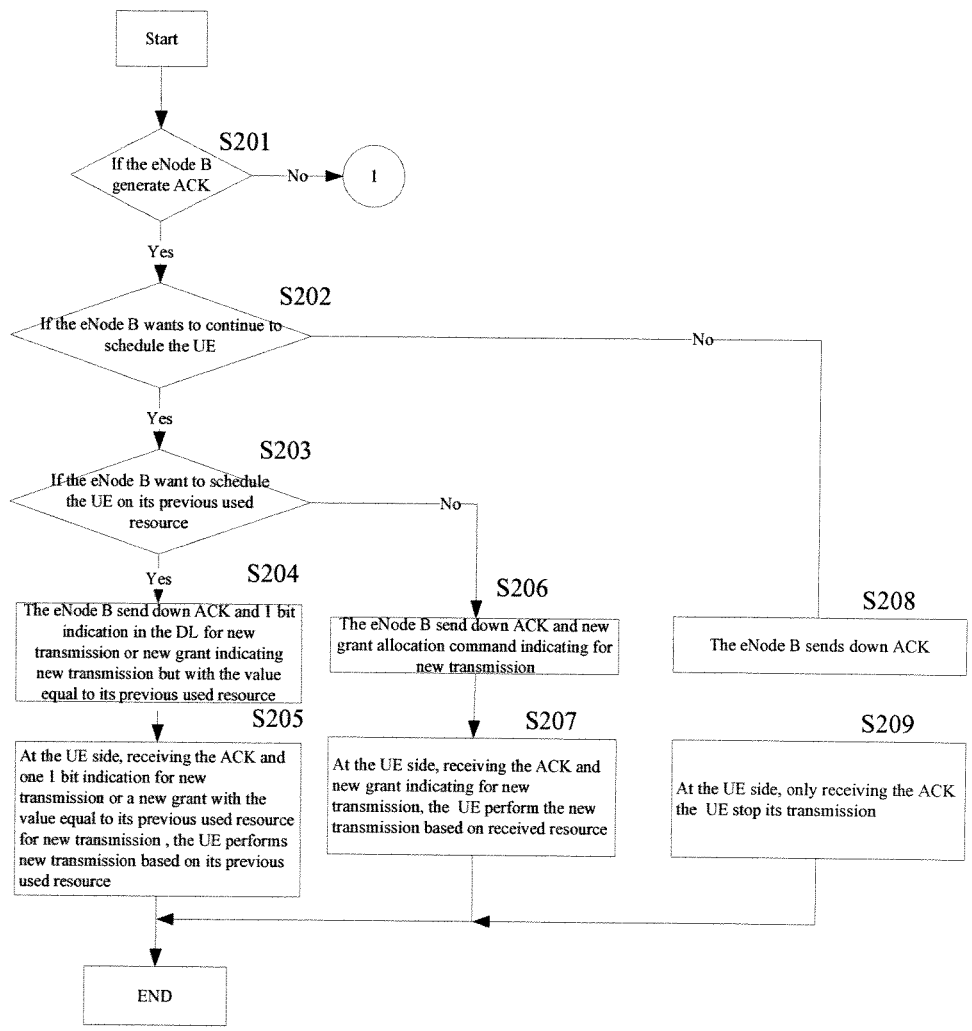
FIG. 2 is a flowchart showing a process of controlling communication of a mobile station by a base station according to an embodiments of the present invention.

FIG. 2 shows a flow of a base station controlling communication of a mobile station according to a preferred embodiment of the present invention. It should be noted that the eNodeB is able to correctly learn, for each uplink HARQ processing, whether to control the UE to transmit new data or to retransmit data in next transmission time interval (TTI) because of a common maximum retransmission number for all radio bearers and a synchronized HARQ in the LTE uplink.

Now, the flow of the eNodeB controlling communication of the UE is specifically described with reference to FIG. 2. First, at the step S201, when the eNodeB receives communication data transmitted from the UE, it is determined whether the eNodeB will send an ACK response to the received data. An ACK packet will be generated if the eNodeB measures that the received signal is correct. The flow then proceeds to the step S202, where it is determined whether the eNodeB will continue scheduling the UE so that the UE can continue its transmission of communication data. The flow will turn to the step S208 if it is determined that the eNodeB does not want to continue scheduling the UE. In the step S208, the eNodeB sends to the UE only the ACK packet to inform the UE of the correct reception of the data packet. After receiving the ACK packet from the eNodeB, the UE detects whether an indicator for transmitting new data packet and a resource use command are received. If the UE receives only the ACK packet but no indicator for transmitting new data packet or resource use command, the UE will stop transmitting data to the eNodeB (step S209).

On the other hand, when it is determined at the step S202 that the eNodeB wants to continue scheduling the UE, the flow proceeds to the step S203, where the eNodeB determines whether to utilize the previously used resource in scheduling the UE. If the determination is YES, i.e., the eNodeB wants to utilize the previously used resource in scheduling the UE, the flow proceeds to the step S204, where the eNodeB sends to the UE an transmission type indicator and a resource use command indicating that the size of resource is equal to that of the previously used resource together with the ACK packet. The transmission type indicator instructs the UE to continuously transmit new data packet. Alternatively, not sending the resource use command together with the ACK packet can represent an instruction instructing the UE to continuously use the previously used resource in transmitting new data packet. In this case, the transmission type indicator is arranged separate from the resource use command.

Then, at the step S205, the UE at the receiving side receives the ACK packet and related information, and detects any included indicator indicating the UE to transmit new data packet or command indicating whether to use previously used resource for transmission. Next, the UE transmits new data packet to the eNodeB by using the previously used resource.

On the other hand, when the determination turns out to be NO at the step S203, i.e., the eNodeB does not want to schedule the UE with the previously used resource, the flow proceeds to the step S206, where the eNodeB sends to the UE the indicator and the resource use command for using new resource together with the ACK packet in the downlink. Again, the indicator indicates the UE to continuously transmit new data packet. Further, the resource use command for using new resource instructs the UE to use newly allocated resource for transmission of new data packet. Then, at the step S207, the UE at the receiving side receives the ACK packet and related information, and detects any included indicator indicating the UE to transmit new data packet and the resource use command. Next, the UE transmits new data packet to the eNodeB by using newly allocated resource.

Figure 3:
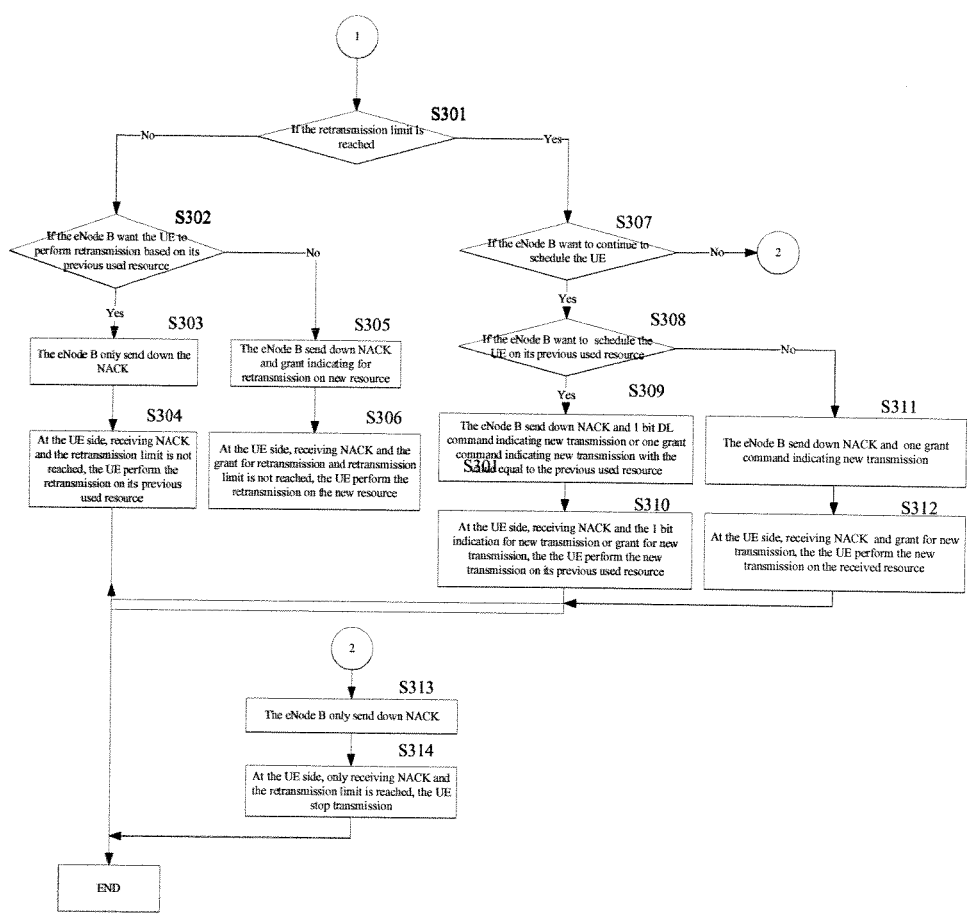
FIG. 3 is a continuation of the flowchart shown in FIG. 2.

At the step S201, when the eNodeB detects that the data received from the UE are incorrect, the eNodeB generates a NACK packet and prepares to control the UE to retransmit the data just previously transmitted. In this case, the flow turns to subsequent steps denoted by the symbol "①," in FIG. 2. FIG. 3 shows a flowchart of the subsequent steps denoted by the symbol "①" in FIG. 2.

As shown in FIG. 3, at the step S301, it is determined whether the number of the UE's data retransmission has reached a predetermined maximum limit. If it is determined at the step S301 that the maximum limit for the UE's data retransmission has not been reached, the flow proceeds to the step S302, where it is further determined whether the eNodeB wants the UE to use previously used resource for data retransmission. If it is determined in the step S302 that the eNodeB wants the UE to use the previously used resource for data retransmission, the flow proceeds to the step S303, at which step the eNodeB sends only the NACK packet to the UE via the downlink, so as to instruct the UE to retransmit the just-transmitted data to the eNodeB. Then, at the step S304, the UE at the receiving side receives the NACK packet sent down from the eNodeB, and determines the retransmission limit has not been reached and the received information contains only the NACK packet but no resource use command. In this case, the UE conducts data retransmission with the previously used resource.

When it is determined at the step S302 that the eNodeB does not want the UE to utilize the previously used resource for data retransmission, the flow proceeds to the step S305, at which step the eNodeB sends to the UE a resource use command for using new resource together with the NACK packet via the downlink. Then, at the step S306, the UE at the receiving side receives the NACK packet and related information sent down from the eNodeB, and determines the retransmission limit has not been reached and the received information contains the NACK packet as well as the resource use command for using new resource. In this case, the UE conducts data retransmission with newly allocated resource by the resource use command. To be noted, alternately, in the above case, an indicator indicating transmission type can be set in the resource use command, and the indicator of transmission type set in the resource use command can be used to instruct a retransmission.

When it is determined at the step S301 that the maximum limit for the UE's data retransmission has been reached, the flow proceeds to the step S307 to further determine whether the eNodeB wants to continue scheduling the UE. If it is determined at the step S307 that the eNodeB wants to continue scheduling the UE, the flow proceeds to the step S308 to further determine whether the eNodeB wants the UE to utilize the previously used resource for transmitting new data packet. If the determination is YES at the step S308, the flow proceeds to the step S309, at which step the eNodeB sends to the UE a transmission type indicator and a resource use command indicating the size of resource equal to that of the previously used resource together with the NACK packet via the downlink Again, the transmission type indicator and/or the resource use command can instruct the UE to transmit new data packet.

Then, at the step S310, the UE at the receiving side receives the NACK packet and related information sent down from the eNodeB, and detects the included transmission type indicator and resource use command that instruct the UE to transmit new data packet. Since the UE receives the resource use command indicating the size of resource is equal to that of the previously used resource, the UE transmits new data packet to the eNodeB by using the previously used resource.

If the determination is NO at the step S308, i.e., the eNodeB does not want to schedule the UE with the previously used resource, the flow turns to the step S311, where the eNodeB sends to the UE the transmission type indicator and the resource use command for using new resource together with the NACK packet in the downlink. Again, the transmission type indicator indicates the UE to continuously transmit new data packet. Further, the resource use command for using new resource instructs the UE to use newly allocated resource for transmission of new data packet. Then, at the step S312, the UE at the receiving side receives the NACK packet and related information, and detects the included indicator indicating the UE to transmit new data packet and the resource use command for using new resource. The UE then transmits new data packet to the eNodeB by using newly allocated resource.

At the step S307, in the case where the maximum limit for the UE's data retransmission has been reached, and it is determined that the eNodeB does not want to schedule the UE, i.e., the eNodeB does not want the UE to continue transmitting new data packet, the flow turns to a subsequent step S313 denoted by a symbol "CD". The eNodeB sends only the NACK packet to the UE at the step S313. Next, at the step S314, the UE receives the NACK packet sent from the eNodeB, and determines that the maximum limit for the UE's data retransmission has been reached. In this case, the UE stop transmission to the eNodeB.

With the above process, by adding to the ACK/NACK packet in the downlink the indicator indicating the UE to transmit new data packet and the resource command instructing the UE to use previously used resource or newly allocated resource for transmission or retransmission, the eNodeB can control the UE to communicate with the eNodeB according to various instructions, and can prepare for respective operations in the eNodeB itself. In this way, operation synchronization between the eNodeB and the UE can be achieved. Further, it is not required for the UE to use in the uplink any data-associated signaling for notifying the eNodeB whether the UE performs new data transmission or data retransmission.

A simplified configuration of the base station of the present invention is described below with reference to FIG. 4. It should be noted, for a simplified and concise description, FIG. 4 shows only those units relevant to the implementation of the present invention, while illustration of other units is omitted. As shown in FIG. 4, the base station comprises an input unit 41, a control unit 42 and an output unit 43. The input unit 41 receives signals from a scheduler (not shown) in the eNodeB concerning whether to continue scheduling the UE, retransmission limit number and HARQ ACK/NACK packet, and provides these information to the control unit 42 of the eNodeB. The control unit 42 performs respective control processes as described with reference to FIGS. 2 and 3 based on the information provided from the input unit 41.

Specifically, the control unit 42 determines whether the UE should transmit new data or retransmit data just transmitted, and adds a transmission type indicator indicating the UE to transmit new data packet if it is determined that new data should be transmitted. In addition, the control unit 42 determines, based on network resource, whether the UE utilize previously used resource or newly allocated resource for transmitting new data packet or retransmitting data packet. In the case where the UE will be instructed to utilize the previously used resource for transmitting new data packet or retransmitting data packet, the control unit 42 does not add to the ACK/NACK packet any resource use command for using new resource or indicating the size of resource equal to that of the previously used resource so as to instruct the UE to utilize the previously used resource for transmitting new data packet or retransmitting data packet. On the other hand, In the case where the UE will be instructed to utilize new resource for transmitting new data packet or retransmitting data packet, the control unit 42 adds a resource use command for using new resource so as to instruct the UE to utilize newly allocated resource for transmitting new data packet or retransmitting data packet. The control unit 42 provides to the output unit 43 the ACK/NACK packet with different types of downlink signaling, and/or the transmission type indicator, and/or the resource use command. The output unit 43 sends the ACK/NACK packet with different types of downlink signaling to the UE via the downlink.

A simplified configuration of the mobile station of the present invention is described below with reference to FIG. 5. It should be noted, for a simplified and concise description, FIG. 5 shows only those units relevant to the implementation of the present invention, while illustration of other units is omitted. As shown in FIG. 5, the base station comprises an input unit 51, a control unit 52 and an output unit 53. The input unit 51 receives the resource use indication, retransmission limit number and downlink HARQ signaling from the eNodeB, and provides these information to the control unit 52 in the mobile station. The control unit 52 performs respective control processes as described with reference to FIGS. 2 and 3 based on the information provided from the input unit 51.

Specifically, the control unit 52 determines, in addition to the ACK/NACK packet, whether there is a transmission type indicator and a resource use command in the received information so as to determine whether to transmit new data packet or to retransmit data packet just transmitted or to stop transmitting data to the eNodeB, and to determine whether to utilize the previously used resource or newly allocated resource for transmitting new data packet or retransmitting data packet. The control unit 52 provides the determination results to the output unit 53, which in turn transmits new data packet or retransmit data packet to the eNodeB according to the determination results.

With the method of the present invention, it is possible to guarantee a correct operation of uplink adaptive HARQ in the case of not using any data-associated signaling in the uplink.

The present invention has been disclosed above with the preferred embodiments. Those skilled in the art can make various variations, replacements and additions to the present invention within the scope of the present invention. Therefore, the scope of the present invention is not limited to the above specific embodiments, but should be defined by the appended claims.

What is claimed is:

1. A communication method for controlling data transmission of a mobile station at a base station, the method comprising:
   determining, by the base station, a transmission operation to be performed by the mobile station in next transmission time interval based on Hybrid Automatic Repeat reQuest (HARQ) and schedule result;
   sending, in a downlink by the base station, an Acknowledgement/Negative Acknowledgement (ACK/NACK), an indicator indicating the type of the transmission by the mobile station and a resource use command for the used resource based on the determined transmission operation;
   receiving, by the mobile station, the ACK/NACK, the indicator and the resource use command sent from the base station, and performing respective transmission operations according to the received ACK/NACK, indicator and resource use command without using any data-associated signaling in an uplink.

2. The communication method of claim 1, further comprising:

if the base station determines a correct reception of the data transmitted from the mobile station, and requests the mobile station to transmit new data packet to the base station by utilizing a previously used resource, sending, by the base station to the mobile station, an ACK, the indicator, and a resource use command indicating that the size of resource is equal to that of the previously used resource.

3. The communication method of claim 2, further comprising:
transmitting, by the mobile station, a new data packet to the base station by utilizing the previously used resource when the mobile station receives from the base station the ACK, the indicator, and the resource use command indicating that the size of resource is equal to that of the previously used resource.

4. The communication method of claim 1, further comprising:
if the base station determines a correct reception of the data transmitted from the mobile station, and requests the mobile station to transmit a new data packet to the base station by utilizing newly allocated resource, sending, by the base station to the mobile station, an ACK, the indicator, and a resource use command for using new resource.

5. The communication method of claim 4, further comprising:
transmitting, by the mobile station, new data packet to the base station by utilizing the newly allocated resource when the mobile station receives from the base station the ACK, the indicator, and the resource use command for using new resource.

6. The communication method of claim 1, further comprising:
sending only an ACK from the base station to the mobile station if the base station determines a correct reception of the data transmitted from the mobile station, and requests the mobile station to stop transmission operation.

7. The communication method of claim 6, further comprising:
stopping the transmission operation at the mobile station when the mobile station receives only the ACK from the base station.

8. The communication method of claim 1, further comprising:
sending only an NACK from the base station to the mobile station if the base station determines an incorrect reception of the data transmitted from the mobile station, a retransmission limit number for the mobile station has not been reached, and the base station requests the mobile station to retransmit data packet by utilizing previously used resource.

9. The communication method of claim 8, further comprising:
retransmitting, by the mobile station, data packet to the base station by utilizing the previously used resource when the mobile station receives only the NACK from the base station and determines that the retransmission limit number has not been reached.

10. The communication method of claim 1, further comprising:
sending, from the base station to the mobile station, an NACK, the indicator and a resource use command for using new resource if the base station determines an incorrect reception of the data transmitted from the mobile station, a retransmission limit number for the mobile station has not been reached, and the base station requests the mobile station to retransmit data packet by utilizing newly allocated resource.

11. The communication method of claim 10, further comprising:
retransmitting, by the mobile station, data packet to the base station by utilizing the newly allocated resource when the mobile station receives from the base station the NACK, the indicator and the resource use command for using new resource, and determines that the retransmission limit number has not been reached.

12. The communication method of claim 1, further comprising:
sending, from the base station to the mobile station, an NACK, the indicator and a resource use command indicating that the size of resource is equal to that of previously used resource if the base station determines an incorrect reception of the data transmitted from the mobile station, a retransmission limit number for the mobile station has been reached, and the base station requests the mobile station to transmit new data packet by utilizing the previously used resource.

13. The communication method of claim 12, further comprising:
transmitting, by the mobile station, new data packet to the base station by utilizing the previously used resource when the mobile station receives from the base station the NACK, the indicator and the resource use command indicating that the size of resource is equal to that of previously used resource, and determines that the retransmission limit number has been reached.

14. The communication method of claim 1, further comprising:
sending, from the base station to the mobile station, an NACK, the indicator and a resource use command for using new resource if the base station determines an incorrect reception of the data transmitted from the mobile station, a retransmission limit number for the mobile station has been reached, and the base station requests the mobile station to transmit new data packet by utilizing newly allocated resource.

15. The communication method of claim 14, further comprising:
transmitting, by the mobile station, new data packet to the base station by utilizing the newly allocated resource when the mobile station receives from the base station the NACK, the indicator and the resource use command, and determines that the retransmission limit number has been reached.

16. The communication method of claim 1, further comprising:
sending only an NACK from the base station to the mobile station if the base station determines an incorrect reception of the data transmitted from the mobile station, a retransmission limit number for the mobile station has been reached, and the base station requests the mobile station to stop transmission operation.

17. The communication method of claim 16, further comprising:
stopping the transmission operation at the mobile station when the mobile station receives only the NACK from the base station and determines that the retransmission limit number has been reached.

18. A base station used in a wireless communication system, the base station comprising:
an input unit for receiving scheduler input signals, retransmission limit number and an HARQ ACK/NACK;

a control unit for determining a transmission operation to be performed by the mobile station in next transmission time interval based on information provided from the input unit, and to form downlink instructions including an ACK/NACK, an indicator indicating the type of the transmission by the mobile station, and a resource use command for the used resource based on the determined transmission operation; and an output unit for sending in a downlink a variety of instructions formed by the control unit.

19. The base station of claim 18, wherein the indicator indicating the type of the transmission is transmitted in a single signaling as additional information included with the resource use command for the used resource.

20. A mobile station used in a wireless communication system, the mobile station comprising:

an input unit for receiving a resource use command, an indicator indicating a transmission type and downlink HARQ signaling including ACK/NACK signaling from a base station, and to provide them to a control unit;

a control unit for controlling the mobile station to perform a transmission operation corresponding to a downlink instruction received from the base station based on information provided from the input unit; and an output unit for transmitting a new data packet or retransmit data packet by using previously used resource or newly allocated resource according to a control signal from the control unit.

21. A communication method for controlling data transmission of a mobile station at a base station, the method comprising:

determining, by the base station, a transmission operation to be performed by the mobile station in next transmission time interval based on Hybrid Automatic Repeat reQuest (HARQ) and schedule result; and sending, in a downlink by the base station, an Acknowledgement/Negative Acknowledgement (ACK/NACK), an indicator indicating the type of the transmission by the mobile station and a resource use command for the used resource based on the determined transmission operation.

* * * * *

UNITED STATES PATENT AND TRADEMARK OFFICE
CERTIFICATE OF CORRECTION

| | | |
|---|---|---|
| PATENT NO. | : 8,897,233 B2 | Page 1 of 1 |
| APPLICATION NO. | : 12/672616 | |
| DATED | : November 25, 2014 | |
| INVENTOR(S) | : Yang et al. | |

It is certified that error appears in the above-identified patent and that said Letters Patent is hereby corrected as shown below:

In the claims

Claim 18, col. 11, line 2 "the mobile station" should be deleted and --a mobile station-- should be inserted.

Signed and Sealed this
Seventeenth Day of May, 2016

Michelle K. Lee
*Director of the United States Patent and Trademark Office*